(12) United States Patent
Ullmann et al.

(10) Patent No.: US 9,016,189 B2
(45) Date of Patent: Apr. 28, 2015

(54) APPARATUS FOR PROVIDING MILK FOR A COFFEE MAKER

(75) Inventors: Erich Ullmann, Egerkingen (CH); Philipp Büttiker, Oberbuchsiten (CH)

(73) Assignee: Jura Elektroapparate AG, Niederbuchsiten (CH)

( * ) Notice: Subject to any disclaimer, the term of this patent is extended or adjusted under 35 U.S.C. 154(b) by 602 days.

(21) Appl. No.: 13/259,001

(22) PCT Filed: Apr. 30, 2010

(86) PCT No.: PCT/CH2010/000111
§ 371 (c)(1),
(2), (4) Date: Nov. 9, 2011

(87) PCT Pub. No.: WO2010/124404
PCT Pub. Date: Nov. 4, 2010

(65) Prior Publication Data
US 2012/0079947 A1     Apr. 5, 2012

(30) Foreign Application Priority Data
Apr. 30, 2009  (EP) ..................................... 09405073

(51) Int. Cl.
A47J 31/40     (2006.01)
A47J 31/44     (2006.01)
A23C 3/037     (2006.01)

(52) U.S. Cl.
CPC ............. *A47J 31/4485* (2013.01); *A23C 3/037* (2013.01); *A47J 31/40* (2013.01)

(58) Field of Classification Search
CPC ....... A47J 31/44; A47J 31/40; A47J 31/4489; A23C 3/037
USPC ........................ 99/290, 293, 323.1, 452, 453; 222/129.3, 129.4, 146.1, 146.2, 146.4, 222/146.6; 261/DIG. 16, DIG. 76
See application file for complete search history.

(56) References Cited

U.S. PATENT DOCUMENTS 5,265,520 A * 11/1993 Giuliano ...................... 99/323.1
5,473,972 A   12/1995 Rizzuto et al.
(Continued)

FOREIGN PATENT DOCUMENTS

DE   10 2005 010600 A1   9/2006
EP       0 803 220 A      10/1997
(Continued)

OTHER PUBLICATIONS

International Search Report from International Patent Application No. PCT/CH2010/000111, filed Apr. 30, 2010.
(Continued)

*Primary Examiner* — Reginald L Alexander
(74) *Attorney, Agent, or Firm* — Alston & Bird LLP

(57) ABSTRACT

The apparatus for providing milk for a coffee maker comprises a milk container having a base container for receiving the milk and a lid disposed on the base container, and at least one tube element, wherein the respective tube element protrudes into the base container and has an inlet opening for the milk, said inlet opening being in fluid connection with an outlet opening for the milk disposed on an upper side of the lid. An elastic sealing collar surrounding the outlet opening is disposed at the outlet opening. A docking system for docking to the milk container comprises a docking piece, which can be brought into a top position and a bottom position, wherein the docking piece has at least one opening for receiving the milk on an underside. If the docking piece is in the top position, the docking piece has no contact with the sealing collar and the sealing collar is shaped such that at least one section of the sealing collar protrudes upward above the respective outlet opening. If the docking position is in the bottom position, the underside of the docking piece is pressed against the sealing collar such that the sealing collar is compressed in the vertical direction and rests in a fluid-tight manner against the docking piece along a closed curve enclosing the particular opening.

19 Claims, 2 Drawing Sheets

(56) References Cited

U.S. PATENT DOCUMENTS

| | | | |
|---|---|---|---|
| 7,448,314 B2* | 11/2008 | Ioannone et al. | 99/452 |
| 7,946,219 B2* | 5/2011 | Marconi | 99/323.1 |
| 2006/0174771 A1 | 8/2006 | Frigeri | |

FOREIGN PATENT DOCUMENTS

| | | |
|---|---|---|
| EP | 1688074 A1 | 8/2006 |
| EP | 2 036 471 A1 | 9/2008 |
| EP | 2 036 470 A | 3/2009 |
| WO | WO 2005/102126 A2 | 11/2005 |
| WO | WO 2008/077264 A1 | 7/2008 |

OTHER PUBLICATIONS

International Preliminary Report on Patentability/Written Opinion for Application No. PCT/CH2010/000111 dated Nov. 15, 2011.
European Search Report for Application No. EP 09 40 5073 dated Oct. 21, 2009.
European Search Report for Application No. EP 09 40 5073 dated Mar. 19, 2010.

* cited by examiner

APPARATUS FOR PROVIDING MILK FOR A COFFEE MAKER

CROSS-REFERENCE TO RELATED APPLICATIONS

This application is a national stage entry of International Application No. PCT/CH2010/000111 filed Apr. 30, 2010, which claims priority to European Patent Application No. 09405073.9 filed Apr. 30, 2009, which applications are hereby incorporated by reference herein in their entirety.

FIELD OF THE INVENTION

The invention relates to the technical field of coffee makers and in particular the field of providing milk for a coffee beverage, in particular an apparatus for providing milk for a coffee maker.

BACKGROUND OF THE INVENTION

Coffee makers which are able to deliver various milk products such as, for example, macchiato, cappuccino, white coffee etc, require a safe, sealed and interruption-free connection to the milk stored in a storage container for the supply of milk.

As a result of the need to store the milk chilled, there are two possibilities for the delivery of milk.

If milk products are only delivered occasionally, it may be appropriate to store the milk container in a chilled environment, preferably in a refrigerator. This container is only fetched as required and placed next to the coffee maker. The connection to the machine can be made by dipping a suction hose into the container. The milk container is then removed again and the parts coming in contact with the milk must be cleaned.

However, if milk products are to be delivered permanently, i.e. at relatively short time intervals, it is better if the milk container stays permanently connected to the machine in a chiller unit provided. Since milk products are enjoying increasing popularity, this arrangement will be increasingly used in future.

The last-mentioned arrangement has the consequence, however that the connection of the milk container is more inconvenient since the line(s) must be passed through the insulating jacket of the chiller unit.

Added to this, for various reasons the interior of the chiller is kept as small as possible for a predefined amount of milk. The associated disadvantages lie in more difficult handling when setting up for milk delivery and also for cleaning, longer hose lines and therefore hygiene problems, and increased liability to breakdown.

Known from U.S. Pat. No. 5,473,972 is a coffee maker having a device for providing milk froth accommodated in a housing of the coffee maker. The device for providing milk froth (hereinafter "frothing device") can be supplied with milk by placing a transportable, milk-filled milk container in a spatial area under the frothing device and thereby connecting a lid of the milk container to a wall section of the coffee maker housing, which wall section is disposed underneath the frothing device and is aligned parallel to the lid of the milk container. During this process a fluid connection must be made at the same time between a supply line accommodated in the coffee maker housing for supplying the frothing device with milk and a tube element by which means milk can be removed from the milk container. The tube element is fastened to the lid of the milk container and has a section having an inlet opening for the milk, which protrudes into the milk container starting from the lid and is guided through the lid in such a manner that a section of the tube element extends vertically upwards above the lid, with the tube element having an outlet opening for the milk at its upper end. In order to make the said fluid connection between the tube element and the supply line to supply the frothing device with milk, a section of the tube element accessible on the upper side of the milk container must be placed over its entire length in its longitudinal direction into a section of the supply line protruding vertically downwards in the coffee maker housing. In order to ensure that the connection between the supply line and the tube element is fluid-tight, the tube element is surrounded by a sealing ring, which is disposed at a distance from the upper end of the tube element and is connected to the lid of the milk container. The distance of the sealing ring from the upper end of the tube element is determined so that the lower end of the supply line is brought in contact with the sealing ring when the milk container is connected to the coffee maker housing and the upper section of the tube element is thereby inserted into the lower end of the supply line. This type of provision of milk has the disadvantage that the milk container must be moved and positioned with great accuracy both horizontally and vertically relative to the housing of the coffee maker or to the supply line in order to be able to make a fluid connection between the tube element and the supply line. Making the fluid connection is therefore inconvenient, time-consuming and difficult to carry out or not practicable in confined spaces. In addition, the dimensions of different parts of the coffee maker and the milk container, which parts must be interconnected when making the fluid connection, must be matched relatively precisely to one another. The construction and manufacture of these parts is therefore relatively complex and costly.

It is the object of the present invention to avoid the said disadvantages and provide an apparatus which ensures a rapid provision of fresh milk for a coffee beverage optionally over a long period of time in a simple and cost-effective manner.

BRIEF SUMMARY OF THE INVENTION

This object is achieved by an apparatus for providing milk for a coffee maker according to embodiments of the present invention, as described herein.

This apparatus for providing milk comprises a milk container having a base container for receiving the milk, a lid disposed on the base container, and at least one continuous tube element for the milk, where the respective tube element has a section having an inlet opening for the milk, which protrudes into the base container starting from the lid and the respective inlet opening is in fluid connection with an outlet opening for the milk disposed on an upper side of the lid, and where respectively one elastic sealing collar which surrounds the outlet opening is disposed at the respective outlet opening. The apparatus for providing milk further comprises a predefined spatial region for receiving the milk container, in which spatial region the milk container can be placed and from which spatial region the milk container can be removed. The apparatus further comprises a docking system for the milk container, which docking system comprises a movable docking piece disposed above the predefined spatial region for docking to the milk container, where the docking piece has at least one opening for receiving the milk, the respective opening is formed on an underside of the docking piece, the docking piece has at least one connection element for the removal of milk and where each one of the respective connection elements communicates with each one of the respective openings of the docking piece via an appurtenant fluid line.

According to the invention, the docking piece is guided in such a manner that it can be brought into an upper position and a lower position. If the milk container is placed in the predefined spatial region and the docking piece is brought into the top position, the docking piece has no contact with the sealing collar and the sealing collar is shaped such that at least one section of the sealing collar protrudes upward above the respective outlet opening. If the milk container is placed in the predefined spatial region and the docking piece is brought into the bottom position, the underside of the docking piece is pressed against the sealing collar such that the sealing collar is compressed in the vertical direction and rests in a fluid-tight manner against the docking piece along a closed curve enclosing the particular opening.

An essential point of the invention consists in the vertical mobility of the docking piece. This allows a rapid coupling of a suitable milk container by simply moving or pressing the docking piece towards the container. A fluid connection to the milk located in the container can then be made in a simple manner via the respective openings on the underside of the docking piece. The container can thus be held in readiness, for example, in a refrigerator and fresh milk can be docked or undocked and then chilled again or refilled substantially faster than hitherto known. The milk can thereby be supplied to different treatment processes resulting from a desired coffee beverage via the individual openings of the docking piece. For example, milk for producing milk froth can be transported via one opening, milk for heating via another opening and milk for adding flavourings via a further opening. Since the milk is conveyed via separate fluid lines, neither losses of quality or cleaning problems arise, such as could occur during an alternative use of a switching valve from one opening to different lines.

Since the docking piece is not in contact with the sealing collar when the milk container is placed in the predefined spatial region and the docking piece is brought into the top position, this has the result that the milk container can be placed in the predefined spatial region without needing to bring it in contact with the docking piece. At the same time, it is advantageous that the milk container can usually also be placed manually in the predefined spatial region without a movement in the vertical direction relative to the docking piece needing to be controlled precisely. The milk container could, for example, be placed on a flat placement area in the predefined spatial region which is at a sufficiently large distance from the top position of the docking piece. In order to bring the milk container into a specific position relative to the docking piece in this case, the milk container could, for example, simply be displaced horizontally on the placement area, for example, in a rectilinear movement. The milk container can thus be placed under the docking piece in a simple manner without bringing the milk container in contact with the docking piece.

Since, when the milk container is placed in the predefined spatial region and the docking piece is brought into the top position, at least one section of the sealing collar protrudes upwards over the respective outlet opening, this has the result that the sealing collar can be compressed over a relatively large distance in the vertical direction by means of the docking piece when the underside of the docking piece is brought in contact with the sealing collar and the docking piece is then pressed against the lid of the milk container. The respective height of the position of the docking piece can in this case usually be reduced until the docking piece either contacts the tube element or the lid of the milk container. In order to ensure that the sealing collar rests in each case in a fluid-tight manner on the underside of the docking piece, it is usually sufficient that the sealing collar rests against the docking piece along a closed curve enclosing the respective opening and the docking piece is pressed against the sealing collar with a contact pressure which reaches or exceeds a predefined minimum value. In the apparatus according to the invention it is therefore ensured that the sealing collar compensates in each case for tolerances in the position of the lid of the milk container, the position of the tube element or the outlet opening for the milk and the position of the underside of the docking piece within certain limits (depending, for example, on the elastic properties or the shape of the respective sealing collar).

In the apparatus according to the invention for providing milk, the docking system and the milk container are dimensioned and matched to one another such that in a docked state in which the underside of the docking piece is pressed against the sealing collar, the respective opening of the docking piece and in each case one of the respective outlet openings on the upper side of the lid of the milk container are tightly connected to one another via a respectively appurtenant sealing collar lying between the upper side of the lid and the underside of the docking piece. At the same time, it is necessary that the docking piece is connected to the lid of the milk container or the tube element.

An essential advantage of the apparatus according to the invention consists in the constructively easily released coupling between the docking system and the milk container, which merely requires a vertically movably guided docking piece and a container matched to this. As a result, on the one hand, the container can be coupled and uncoupled particularly rapidly but on the other hand, it can also remain docked for a long time, accommodated in a corresponding chiller unit, without needing to fear any loss of quality of the milk.

In a preferred embodiment of the apparatus according to the invention, the docking system is equipped with an operating mechanism which is designed for the manual movement of the docking piece by a user. A particularly simple, reliable and maintenance-friendly usage of the apparatus is thereby possible. However, it is also feasible to make the operating mechanism electric-motor-driven.

In order to produce a defined contact pressure against the milk container, the docking element is preferably mounted against an elastically resilient actuator. A required tightness of the connection between the container and the docking piece is thereby ensured or improved.

The underside of the docking piece, i.e. the side of the docking piece facing the milk container is preferably configured as a flat surface to enable sealing abutment of the elastic sealing elements between docking piece and milk container. For this purpose, the underside of the docking piece can itself be provided with an elastic layer.

In order to produce the vertical mobility of the docking piece in a particularly simple constructive manner, the fluid lines are preferably designed as elastic hoses which extend between the at least one movable opening of the docking piece and a spatially fixed position of the at least one connection element.

In a further embodiment of the apparatus according to the invention, the respective tube elements protrude at least partially over the upper side of a lid of the milk container. This has the advantage that a sealing collar according to the invention can be fastened in a particularly simple manner on the section of the respective tube element protruding over the upper side of the lid. For this purpose, the respective collar must merely be shaped so that it can be placed in a sealing manner on the section of the respective tube element protruding over the upper side of the lid.

A suction unit for extracting milk is preferably provided for particularly easy removal of milk from the respective milk container. The suction unit can, for example, be connected to the respective connection element in such a manner that a suction for extracting the milk from the base container can be produced in the respective fluid line.

Although the milk container can be docked rapidly and simply onto the docking system or can be coupled to this, it can also be preferable to provide a chiller unit for receiving the milk container. The milk container then only needs to be undocked for filling with fresh milk or for cleaning. Further expenditure is therefore no longer associated with the provision of fresh milk.

The advantage of the present invention is also achieved by a coffee maker combined with an apparatus according to the invention for providing milk. An essential point of such a coffee maker consists in that this affords the possibility of docking a milk container simply and rapidly. In this context, the docking system can be designed both as an integral part of the coffee maker or be detachably connectable to the coffee maker via the at least one connection element. Due to a detachable, in particular standardised connection of the at least one connection element to the coffee maker, a docking system is provided which enables already existing coffee makers to be retrofitted with this docking system.

An essential point of the invention further consists in the particularly simple structure of the milk container which only requires a corresponding lid with the said tube elements and appurtenant sealing collars for the removal of milk. Such a lid can therefore be manufactured simply and inexpensively and as a result of its easy handling, is also easy to clean.

An advantage is obtained if the respective tube element can be detachably connected to the lid. The tube elements are therefore completely exchangeable for hygiene reasons or are easier to clean and reuse. To this end, these tube elements can, for example, be plugged, be clamped on the lid or be screwed to the lid. The tube elements can in principle be configured in rigid or elastic form, for example, made of plastic or metal pipes or as plastic hose.

The sealing collars can in principle be of a conventional type and have, for example, an annular or rectangular profile in one cross-section. A corresponding groove for receiving the collars can be provided in the lid of the milk container. A collar having a rectangular cross-section can, however, also be glued directly on the upper side of the lid. However several advantages are equally achieved if the at least one sealing collar has the shape of a funnel which opens in a direction pointing away from the upper side of the lid. Such a collar as it were compresses when acted upon by a suction pressure for transporting the milk and increases the contact pressure on an opposite sealing surface. In addition, after uncoupling the milk container, drops of back-flowing milk or cleaning fluid are collected in the funnel of the collar and do not contaminate the lid of the container. In addition, positional tolerances of the container with respect to the (suction) openings of the docking system are compensated.

Such funnel-shaped sealing collars are particularly easy to apply to the lid if the at least one of the tube elements passes through the lid and at least partially protrudes beyond its surface. The collar must therefore merely be dimensioned so that it can be placed in a sealing manner on the projecting tube element.

The preceding advantage of the present invention will also be achieved by a method for providing milk using an apparatus according to the invention for providing milk.

In this method the docking piece of the respective docking system is pressed against the lid of the milk container for removing milk from the respective milk container so that the at least one outlet opening on the upper side of the lid of the milk container is tightly connected to the at least one opening of the docking piece via a sealing collar and a vacuum is produced which makes the milk flow out of the milk container into the docking piece via the connection thus made. This method is characterised by its very simple and efficient sequence and is constructively particularly simple and inexpensive to achieve.

BRIEF DESCRIPTION OF THE SEVERAL VIEWS OF THE DRAWINGS

The present invention is explained in detail hereinafter by means of an exemplary embodiment with reference to the appended figures. Parts which are the same or which have the same effect are designated by the same reference numbers. In the figures.

DETAILED DESCRIPTION

Figure 1:
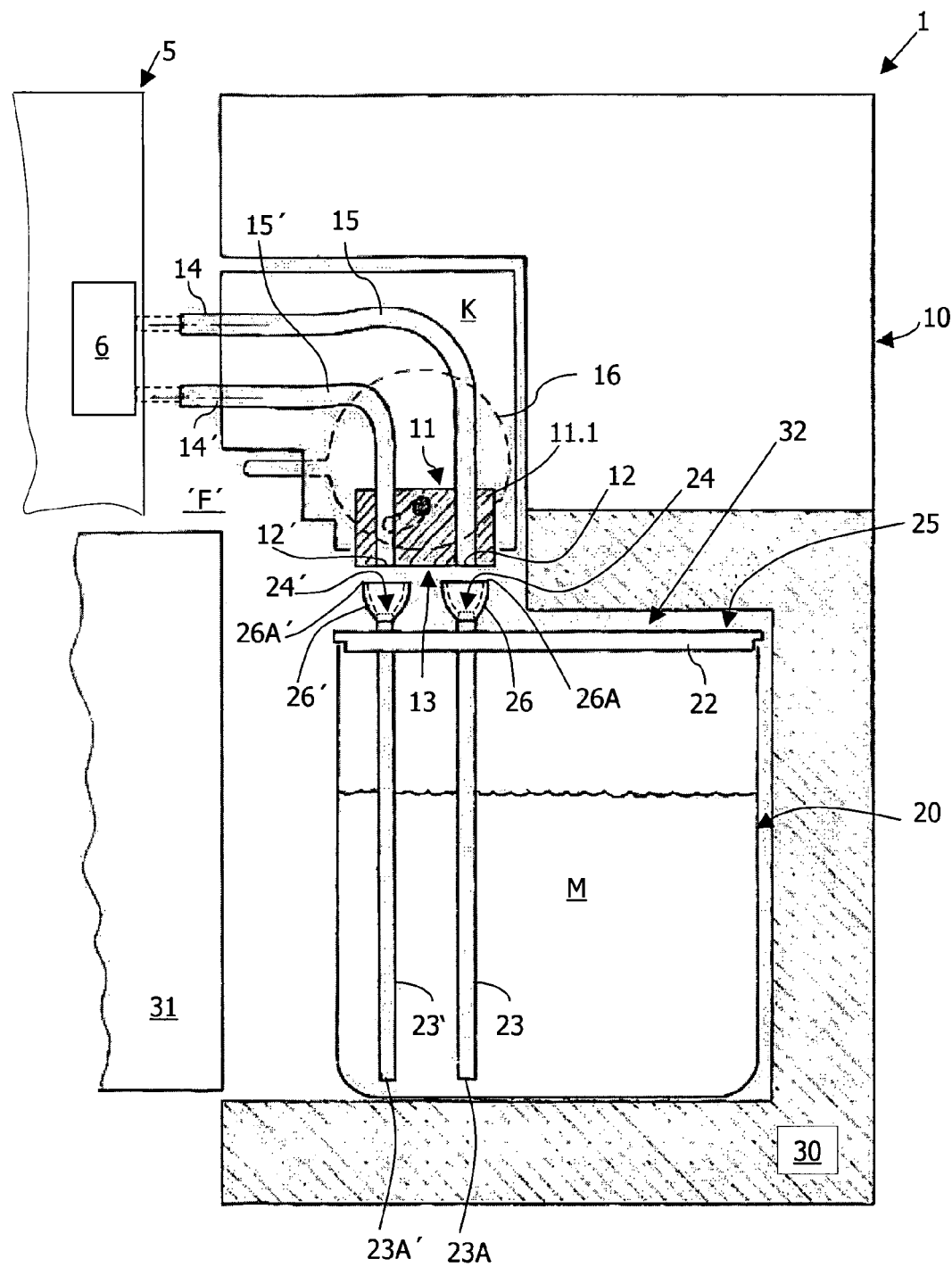
FIG. 1 shows a cross-sectional view of an apparatus for providing milk for a coffee maker, comprising a milk container disposed in a chiller unit and a docking system for the milk container, where the container is located in an uncoupled state

FIG. 1 shows an apparatus 1 for providing milk M comprising a docking system 10 for a milk container 20 with a chiller unit 30 mounted below said container, in which the container 20 is located in an uncoupled state F (in which the milk container 20 is not coupled or docked onto the docking system 10). Two openings 12, 12' for extracting milk M from the container 20 are provided in an underside 13 of a vertically movably guided docking piece 11. The openings 12, 12' are connected to connecting elements 14, 14' via flexible fluid lines 15, 15', which become deformed with respect to the spatially fixedly arranged connecting elements 14, 14' when the docking piece 11 is moved vertically. A coffee maker 5 is coupled to the docking system 10 via the connecting elements 14, 14'. An operating mechanism 16 comprising a lever guided on a link (both not indicated in detail) is provided for moving the docking piece 11 in the direction of the milk container 20. The openings 12, 12' of the docking piece 11 are aligned onto outlet openings 24, 24' for the milk formed on an upper side of the milk container 20 and are brought into a tight connection (for fluids such as milk, for example) with these outlet openings 24, 24' when the docking piece 11 is depressed by a user.

The milk container 20 itself is placed via an access which can be closed by means of a door 31 in a predefined spatial region 32 in the cooling unit 30.

For manufacturing and maintenance reasons the docking piece 11 with the operating mechanism 16, the fluid lines 15, 15' and the connection elements 14, 14' is accommodated in a cassette unit K.

Figure 2:
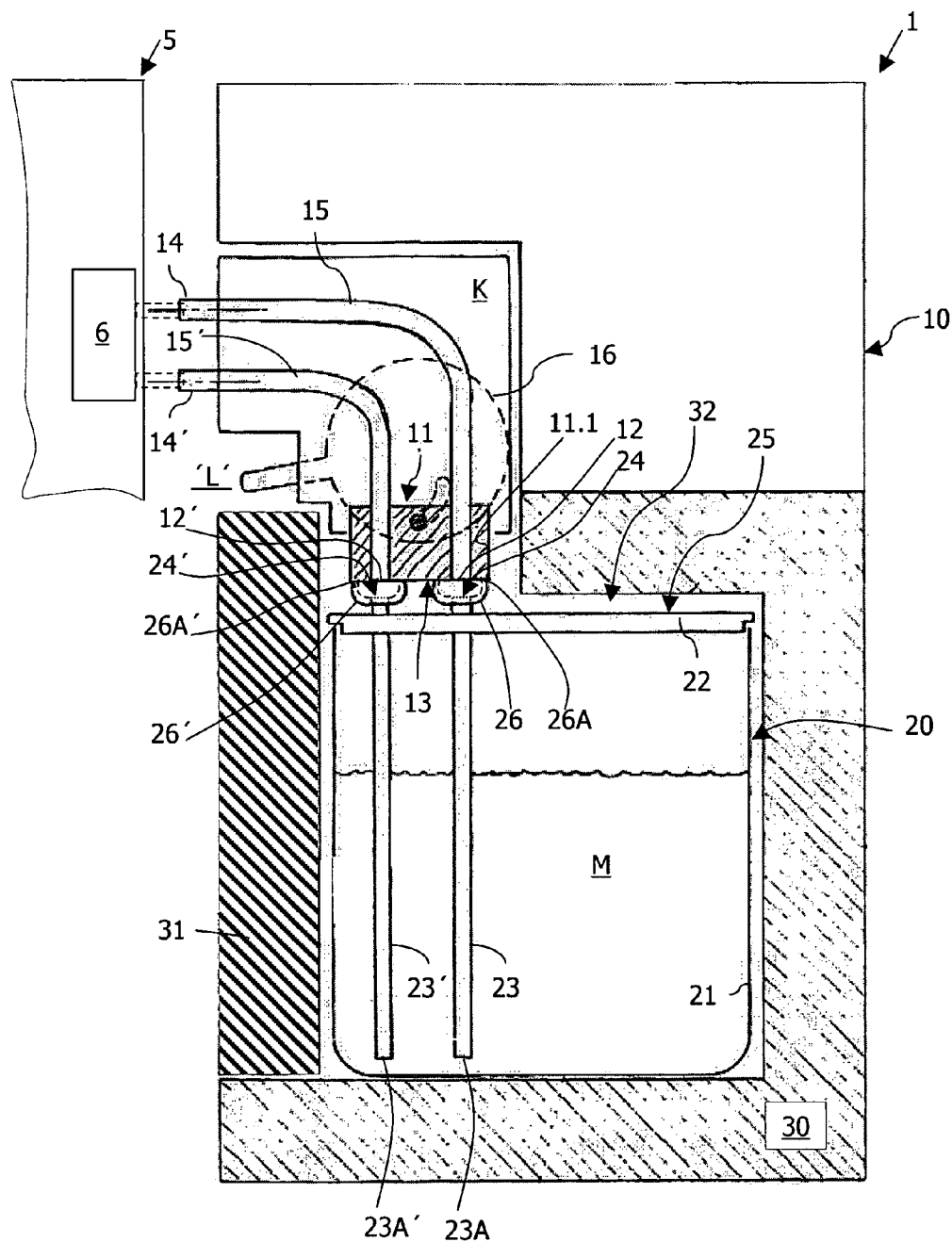
FIG. 2 shows the view from FIG. 1, in which the milk container is located in a coupled or docked state.

FIG. 2 shows the apparatus 1 in a situation in which the milk container 20 is located in a coupled or docked state L. By depressing the docking piece 11 in the direction of a surface 25 of a lid 22 of the milk container 20, elastic sealing collars (or grommets) 26, 26' are brought in tight contact with the underside 13 of the docking piece 11. The outlet openings 24, 24' for the milk M which are disposed on the upper side of the lid 22 of the container 20 and which are formed in this example by the tube elements (or suction tubes) 23, 23' passing through the lid 22, now communicate in a fluid-tight manner with the openings 12, 12' of the docking piece 11. The ends of the tube elements 23, 23' protruding on the upper side 25 of the lid 22 are used here for attachment of the sealing collars 26, 26' which are placed on these ends. The sealing collars 26, 26' are configured such that on the one hand they can absorb the largest possible vertical positional tolerances of the container lid 22 and the docking piece 11 and thereby remain reliably sealed and ensure a clean backflow of milk or a cleaning liquid into the container 20 after uncoupling the docking piece 11. For this purpose, the sealing collars 26 or 26' are shaped in such a manner that they surround the respective outlet opening 24, 24' in an annular shape and furthermore each have an upper edge 26A or 26A' which protrudes upwards over the respective outlet opening 24 or 24'. The further the respective upper edge 26A or 26A' of the respective sealing collar 26 or 26' protrudes upwards above the respective outlet opening or 24', the larger the vertical positional tolerances of the container lid 22 and of the docking piece 11 which can be compensated by the respective sealing collars 26, 26'. The upper edge 26A or 26A' of the respective sealing collar 26 or 26' has (in a horizontal plane) an annular cross section which is dimensioned so that the respective upper edge 26A or 26A' rests in a fluid-tight manner against the docking piece 11 along a closed curve enclosing the respective opening 12 or 12' when the docking piece 11 is pressed from above against the respective sealing collar 26 or 26' (as indicated in FIG. 2).

As FIGS. 1 and 2 further indicate, the respective sealing collars 26, 26' each have the shape of a funnel which opens upwards. Accordingly, the sealing collars 26, 26' each have an internal cross-section whose surface increases as a function of the respective distance from the lid 22 in the direction of a vertical. The latter enables, among other things, a clean backflow of milk or a cleaning fluid from the respective fluid lines 15, 15' into the container 20 when the docking piece 11 is uncoupled from the sealing collars 26, 26' (as shown in FIG. 1).

As FIGS. 1 and 2 indicate the tube elements 23, 23' each have an inlet opening 23a or 23A' for the milk at their lower end. The tube elements 23, 23' thereby extend as deeply as possible into a base container 21 of the milk container 20 in order to exhaust the milk volume. The door 31 of the chiller unit 30 is now closed for permanent cooling of the milk M. When the door 31 is open, the milk container can be inserted into the chiller unit 30 in a rectilinear movement and removed from this.

The docking system 10 shown here for a milk container 20 can be connected via the connecting elements 14, 14' to a coffee maker and can thus be connected flexibly to already existing coffee makers. However, it can also be designed as an integral part of a coffee maker.

In the present example according to FIGS. 1 and 2, the docking system 10 is connected to a coffee maker 5. For this purpose the connecting elements 14 and 14' are connected to a suction unit 6 of the coffee maker. By means of the suction unit 6, after docking of the docking piece 11 on the milk container 20 (state L according to FIG. 2), milk can be extracted from the milk container 20 via the tube elements 23, 23' and the fluid lines 15, 15' so that the extracted milk can be supplied to further processing. The further processing of the extracted milk can take place inside and/or outside a housing (not shown in FIGS. 1 and 2) of a coffee maker 5, where the milk extracted via the fluid line 15 and the milk extracted via the fluid line 15' can be further processed in the same or in different ways: the milk extracted in each case can be heated, for example, or mixed with air to produce hot milk or milk froth.

The cassette K with the docking piece 11 provided therein, the elements 14, 14', the lines 15, 15' and the operating mechanism 16 can be built fixedly or removably for cleaning purposes in the docking system 10.

Since the milk container 20 can be coupled very rapidly to the docking system 10, a chiller unit 30 need not necessarily be provided. The container can alternatively be provided in a refrigerator and only removed from time to time. In any case, a rapid provision of fresh milk for a coffee beverage over a long period of time is ensured in a simple and inexpensive manner.

The invention claimed is:

1. Apparatus for providing milk for a coffee maker, which apparatus comprises:
    a milk container having a base container for receiving the milk and a lid disposed on the base container, and
    at least one continuous tube element for the milk, wherein the respective tube element has a section having an inlet opening for the milk, which protrudes into the base container starting from the lid and the respective inlet opening is in fluid connection with an outlet opening for the milk disposed on an upper side of the lid, and wherein respectively one elastic sealing collar which surrounds the outlet opening is disposed at the respective outlet opening;
    a predefined spatial region for receiving the milk container, in which spatial region the milk container can be placed and from which spatial region the milk container can be removed;
    a docking system for the milk container, which docking system comprises a movable docking piece disposed above the predefined spatial region for docking to the milk container, wherein the docking piece has at least one opening for receiving the milk, at least one opening is formed on an underside of the docking piece, the docking piece has at least one connection element for the removal of milk and wherein at least one connection element communicates with the at least one opening of the docking piece via an appurtenant fluid line,
        wherein the docking piece is guided in such a manner that it is enabled to be brought into an upper position and a lower position,
        wherein, if the milk container is placed in the predefined spatial region and the docking piece is brought into the upper position, the docking piece has no contact with the sealing collar and the sealing collar is shaped such that at least one section of the sealing collar protrudes upward above the respective outlet opening,
        wherein, if the milk container is placed in the predefined spatial region and the docking piece is brought into the lower position, the underside of the docking piece is pressed against the sealing collar such that the sealing collar is compressed in the vertical direction and rests in a fluid-tight manner against the docking piece along a closed curve enclosing the particular opening, and
        wherein a suction unit is provided which is connected to the at least one connection element in such a way that the suction unit is enabled to produce a suction in the fluid line to extract milk from the base container.

2. The apparatus according to claim 1, wherein the respective sealing collar has the shape of a funnel which opens in a direction pointing away from the upper side of the lid.

3. The apparatus according to claim 1, wherein the respective sealing collar has an annular-shaped edge on a side facing away from the lid of the milk container.

4. The apparatus according to claim 1, wherein the respective sealing collar has an inner cross-section whose area increases as a function of the respective distance from the lid in the direction of a vertical.

5. The apparatus according to claim 1, wherein the respective tube element is connected to the respective sealing collar.

6. The apparatus according to claim 1, wherein the respective tube element can be detachably connected to the lid.

7. The apparatus according to claim 1, that is equipped with an operating mechanism which is designed for the manual movement of the docking piece by a user.

8. The apparatus according to claim 1, wherein the docking piece is mounted against an elastically resilient actuator.

9. The apparatus according to claim 1, wherein the underside of the docking piece is configured as a flat surface.

10. The apparatus according to claim 1, wherein the respective fluid line is designed as an elastic hose.

11. The apparatus according to claim 1, having a chiller unit for receiving a milk container.

12. A coffee maker comprising an apparatus for providing milk according to claim 1, in which the apparatus is designed as an integral part of the coffee maker or is detachably connected to the coffee maker via the at least one connection element.

13. The apparatus according to claim 2, wherein the respective sealing collar has an annular-shaped edge on a side facing away from the lid of the milk container.

14. The apparatus according to claim 2, wherein the respective sealing collar has an inner cross-section whose area increases as a function of the respective distance from the lid in the direction of a vertical.

15. The apparatus according to claim 3, wherein the respective sealing collar has an inner cross-section whose area increases as a function of the respective distance from the lid in the direction of a vertical.

16. The apparatus according to claim 2, wherein the respective tube element is connected to the respective sealing collar.

17. The apparatus according to claim 3, wherein the respective tube element is connected to the respective sealing collar.

18. The apparatus according to claim 4, wherein the respective tube element is connected to the respective sealing collar.

19. The apparatus according to claim 5, wherein the respective tube element can be detachably connected to the lid.

* * * * *